(12) United States Patent
Chang

(10) Patent No.: US 9,273,710 B1
(45) Date of Patent: Mar. 1, 2016

(54) RAPID MOUNTING HOLLOW WALL ANCHOR

(71) Applicant: Neo Mechanics Limited, Hong Kong (HK)

(72) Inventor: Kyong Tae Chang, Academy Town (KR)

(73) Assignee: Neo Mechanics Limited, Hong Kong (HK)

( * ) Notice: Subject to any disclaimer, the term of this patent is extended or adjusted under 35 U.S.C. 154(b) by 0 days.

(21) Appl. No.: 14/481,863

(22) Filed: Sep. 9, 2014

(51) Int. Cl.
*A47F 5/08* (2006.01)
*F16B 13/08* (2006.01)
*F16M 13/02* (2006.01)

(52) U.S. Cl.
CPC ............... *F16B 13/08* (2013.01); *F16M 13/02* (2013.01)

(58) Field of Classification Search
CPC ... A47B 96/06; F16B 13/003; F16B 13/0808; F16B 45/00; F16B 13/08; F16B 13/02
See application file for complete search history.

(56) References Cited

U.S. PATENT DOCUMENTS

2008/0253860 A1* 10/2008 McDuff et al. ............... 411/344

* cited by examiner

*Primary Examiner* — Amy Sterling
(74) *Attorney, Agent, or Firm* — Ella Cheong Hong Kong; Sam T. Yip

(57) ABSTRACT

A rapid mounting hallow wall anchor comprises a cleat with latching tooth and hanging flange, and a T-shaped anchor structure with latching cogs on its stem. The cleat comprises a tube with a flange near or at one end of the tube. There are latching teeth inside of the tube for engaging the latching cogs on the stem. The tube flange can be made to have a groove or hook on where objects can be hung. A cross bar joins one end of the stem with a cross bar hinge. The cross bar hinge allows the cross bar to be bended for insertion into a drilled hole in a plasterboard of a hallow wall.

5 Claims, 6 Drawing Sheets

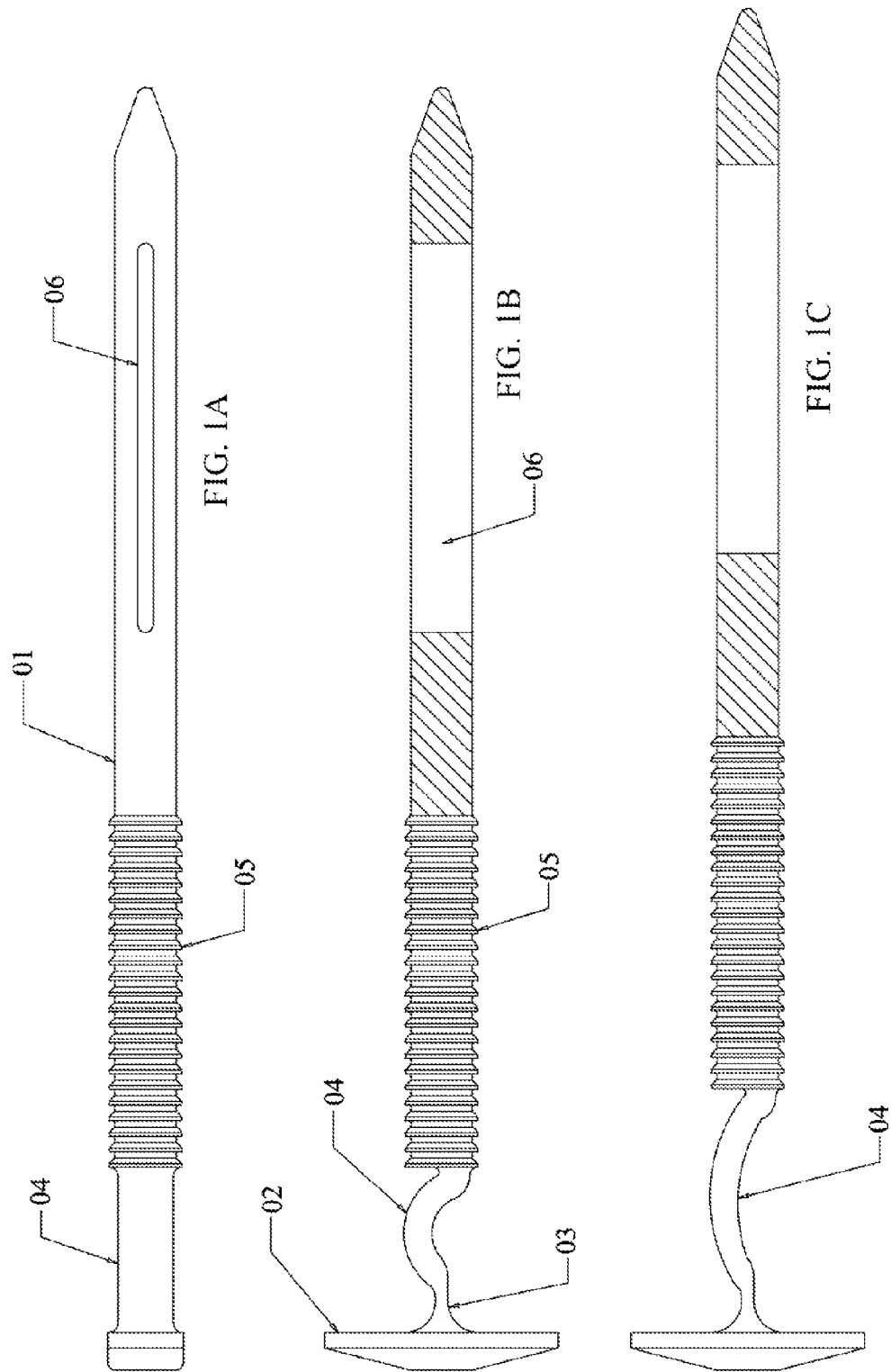

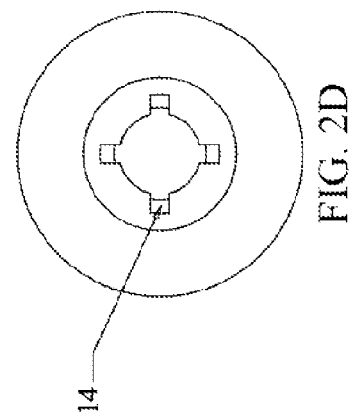
FIG. 2D
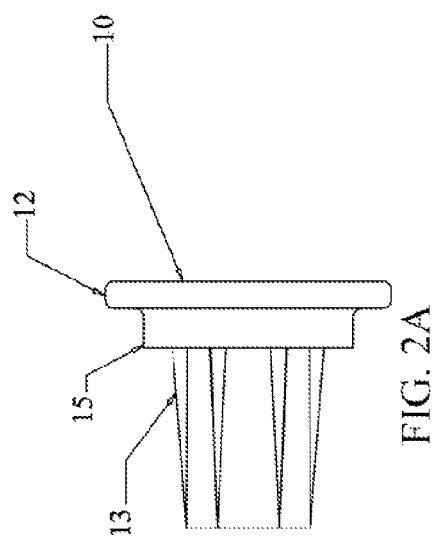
FIG. 2A
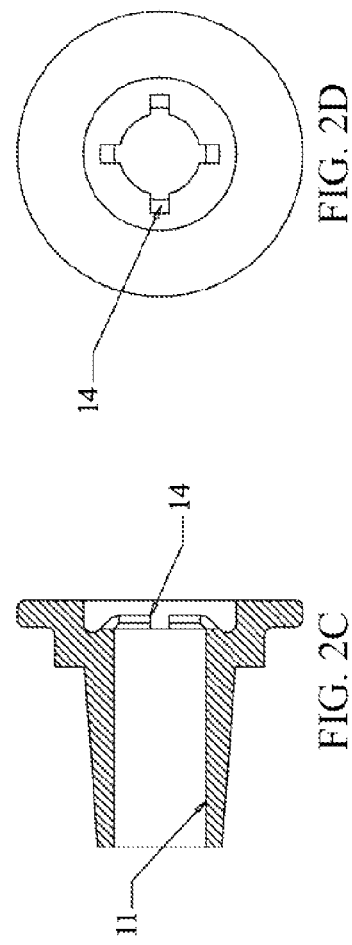
FIG. 2C
FIG. 2B

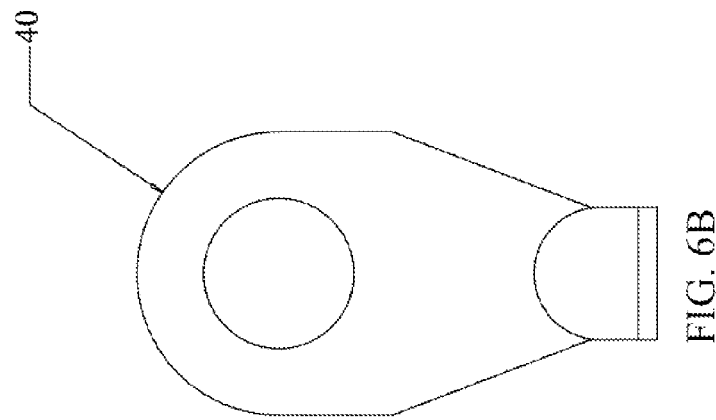
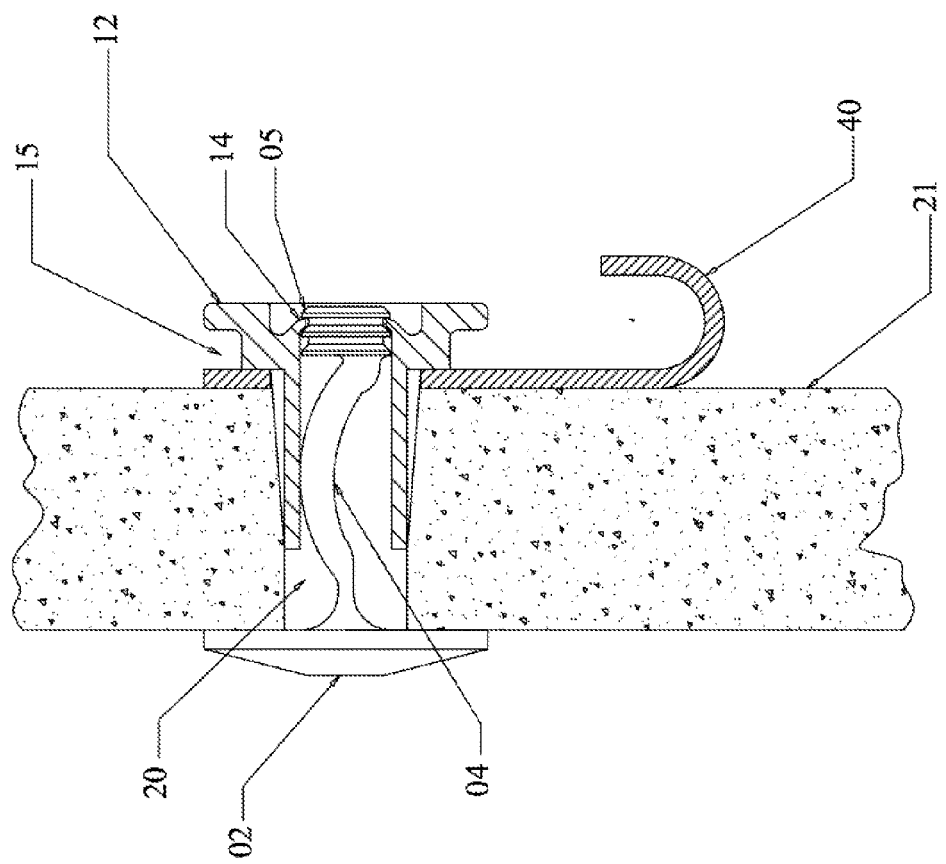

RAPID MOUNTING HOLLOW WALL ANCHOR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to apparatus and method of installing a hollow wall anchor.

BACKGROUND

A hollow wall, or cavity wall, is a wall formed of two thicknesses of masonry with a space between them. A hollow wall is commonly used in a building interior for permanent room partitions and ceilings. Such indoor hollow walls are often built of plasterboards or drywalls. Hollow walls made of plasterboards are relatively inexpensive and could provide excellent insulation when installed with insulation materials in their cavities. However, to hang something on a hollow wall, the use of specially designed hollow wall anchors are preferable as conventional nails, hooks, and studs could easily damage it.

There are numerous commercially available hollow wall anchors in the market. However, to the knowledge of the inventor, all of them are devised with screw fastening structures, which require substantial amount of labor and time in their installation.

SUMMARY

It is an objective of the present invention to provide a rapid mounting hollow wall anchor that can be installed in as short time as a few seconds and with minimal effort. It is a further objective of the present invention to provide such a rapid mounting hollow wall anchor having a structural rigidity and strength that are at least the same as, if not higher than, those of screw fastening type anchors.

In accordance to various embodiments of the present invention, the rapid mounting hollow wall anchor is primarily made of polyamide 6/6, e.g. Nylon 6/6, of tensile strength of 2,500 Newton per square mini-meter (362,500 PSI). As such, this material is stronger than mild steel.

In accordance to one embodiment, the rapid mounting hollow wall anchor comprises a cleat with latching tooth and hanging flange, and a T-shaped anchor structure with latching cogs on its stem. The cleat comprises a tube with a flange near or at one end of the tube. There are one or more latching teeth inside of the tube. The tube flange can be made to have a groove or hook on where objects can be hung. The flange of the cleat can adopt various shapes according to the user's needs; for instance, a rope pulley and a disk with a hook. The tube of the cleat is structured to have passage to allow the stem of the T-shaped anchor structure to pass through there within. Inside of the passage of the tube is a lever with elastic deformable allowance. One or more latching teeth are made from the lever to engage the latching cogs on stem of the anchor structure when inserted into the passage of the tube.

The anchor structure has a long flexible stem with a solid cross bar at one end. The cross bar joins the one end of the stem with a cross bar hinge. At its normal un-bended position, the cross bar is perpendicular to the stem. The cross bar hinge allows the cross bar to be bended at least 90 degree from its normal position. When bended 90 degree, the cross bar becomes approximately parallel to the stem, making the anchor structure a strait bar for insertion into a drilled hole in a plasterboard of a hollow wall.

To install the rapid mounting hollow wall anchor, first bend the cross bar for insertion into a drilled hole in a plasterboard of a hollow wall. The cross bar is to be inserted first. Once the cross bar is fully inserted into the drill hole and that the cross bar resumes its normal position in the cavity of the hollow wall and behind the back of the plasterboard, pull the stem away from the wall until cross bar catches the rear surface of the plasterboard. Secondly, insert the stem through the passage of the tube of the cleat from the end distal from the flange, along the stem and push the tube into the drilled hole until the flange of the cleat is pressed firmly against the surface of the plasterboard. Again strongly pull the stem away from the wall while holding the cleat in place until the stem is stretched and that the latching cogs on the stem and the latching teeth in the tube of cleat are firmly engaged. Finally, cut the portion of the stem that is extending out from the cleat.

BRIEF DESCRIPTION OF THE DRAWINGS

Embodiments of the invention are described in more detail hereinafter with reference to the drawings, in which:

FIG. 1A illustrates a first side view of an anchor stem structure of a hollow wall anchor in accordance with an embodiment of the presently claimed invention, FIG. 1B illustrates a second side view of the anchor stem structure, and FIG. 1C illustrates the second side view of the cleat of the anchor stem structure when under a stretched condition;

FIG. 2A illustrates a side view of a cleat of a hollow wall anchor in accordance with an embodiment of the presently claimed invention, FIG. 2B illustrates a top view of the cleat, FIG. 2C illustrates a side cross sectional view of the cleat, and FIG. 2D illustrates a bottom view of the cleat;

FIG. 6A illustrates a hollow wall anchor assembly in the drilled hole of the plasterboard of the hollow wall after its installation is completed in accordance with an embodiment of the presently claimed invention, and FIG. 6B illustrates a hook used as part of the hollow wall anchor assembly.

DETAILED DESCRIPTION

Figure 3:
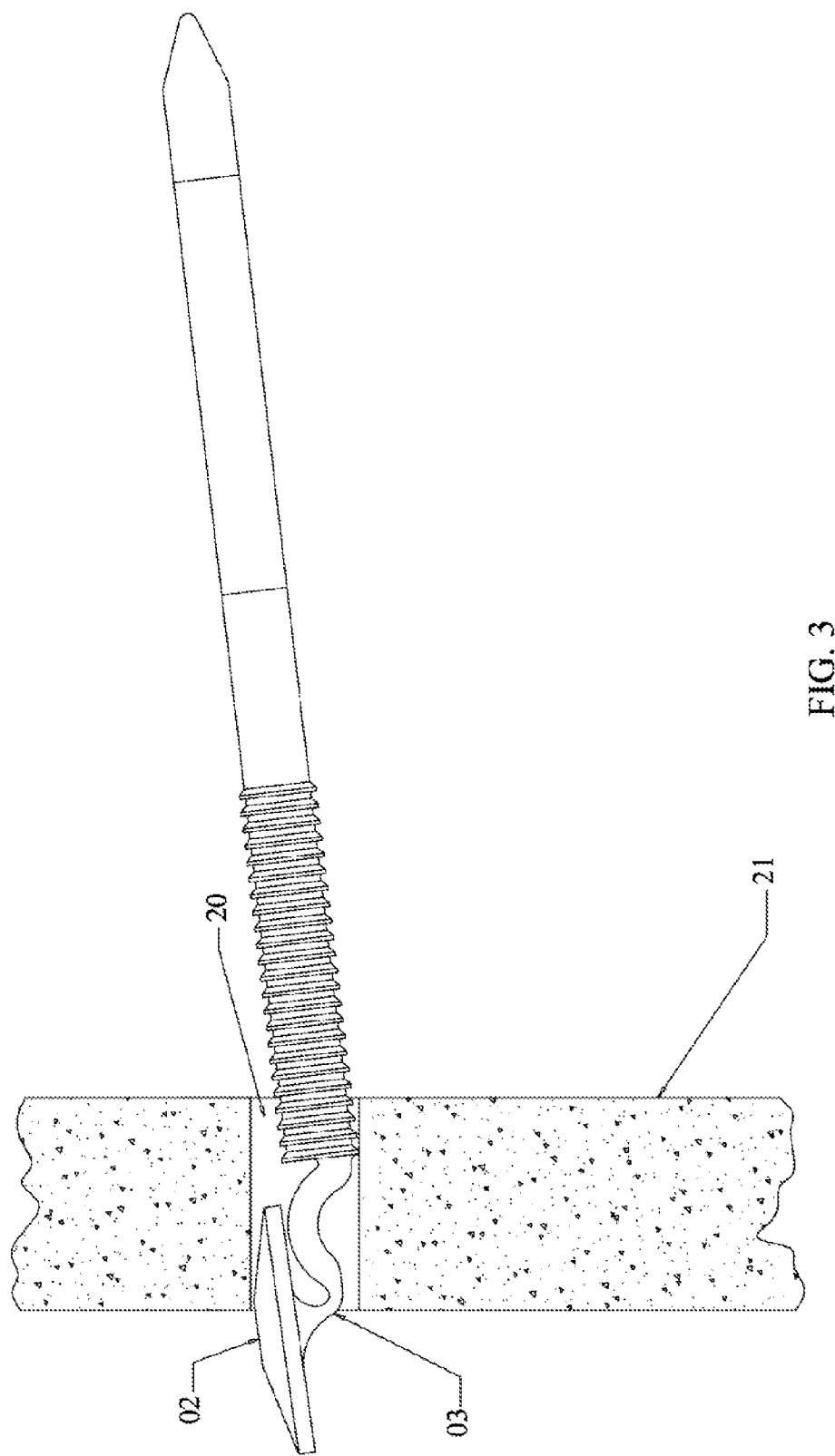
FIG. 3 illustrates the cross bar and stem body of the anchor stem structure of the hollow wall anchor being inserted into a drilled hole in a plasterboard of a hollow wall in accordance with an embodiment of the presently claimed invention.

In the following description, apparatuses and methods of installing a hollow wall anchor and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Referring to FIGS. 1A-1C. In accordance to one aspect of the present invention, the rapid mounting hollow wall anchor comprises a T-shaped anchor structure. The anchor structure comprises a stem body (01), a cross bar (02), a cross bar hinge (03) connecting the cross bar (02) to an elastic expansion-tension element (04) which is connecting to one end of the stem body (01), one or more latching cogs (05) on at least a portion of the stem body (01), and a pulling-slot (06) in at least a portion of the stem body (01) distal from the cross bar (02). The pulling-slot (06) is an opening that allows a pulling bar to be inserted through there within. The stem body (01) is flexible. At its normal un-bended position, the cross bar (02) is substantially perpendicular to the stem body (01), thus forming a T-shaped structure. The cross bar hinge (03) allows the cross bar (02) to be bended at least 90 degree from its normal position. When bended 90 degree, the cross bar (02) becomes approximately parallel to the stem body (01), making the anchor structure a strait bar for insertion into a drilled hole in a plasterboard of a hollow wall. In accordance to one embodiment, the cross bar hinge (03) is made of elastic material such that when the cross bar (02) is bended, the cross bar hinge (03) is resistive and coiled or stretched. In accordance to another embodiment, the cross bar hinge (03) includes an elastic mean to provide the resistive force.

Referring to FIGS. 2A-2D. In accordance to another aspect of the present invention, the rapid mounting hollow wall anchor further comprises a cleat. The cleat comprises a tube (10). Inside the tube (10) is an anchor stem through passage (11). Near or at one end of the tube is a flange (12). Optionally, there can be one or more guides or threads (13) on the exterior surface of the tube (10). The guides or threads (13) provide additional contact surface and hence fiction and securing lateral force against the interior surface of a drilled hole in a plasterboard when the tube (10) is inserted into the drilled hole. The preferred embodiment of the tube (10) is cylindrical in shape for fitting conventionally drilled holes. However, other shapes can also be adapted for different types and shapes of drilled holes. Inside of the anchor stem through passage (11) of the tube (10) is a lever with elastic deformable allowance. One or more latching teeth (14) are made from the lever to engage the latching cogs (05) on the stem body (01) of the anchor structure when inserted into the anchor stem through passage (11). The flange (12) can be made to have a groove (15) or hook on where objects can be hung. The flange (12) can also adopt various shapes according to the user's needs; for instance, a rope pulley and a disk with a hook.

Figure 4:
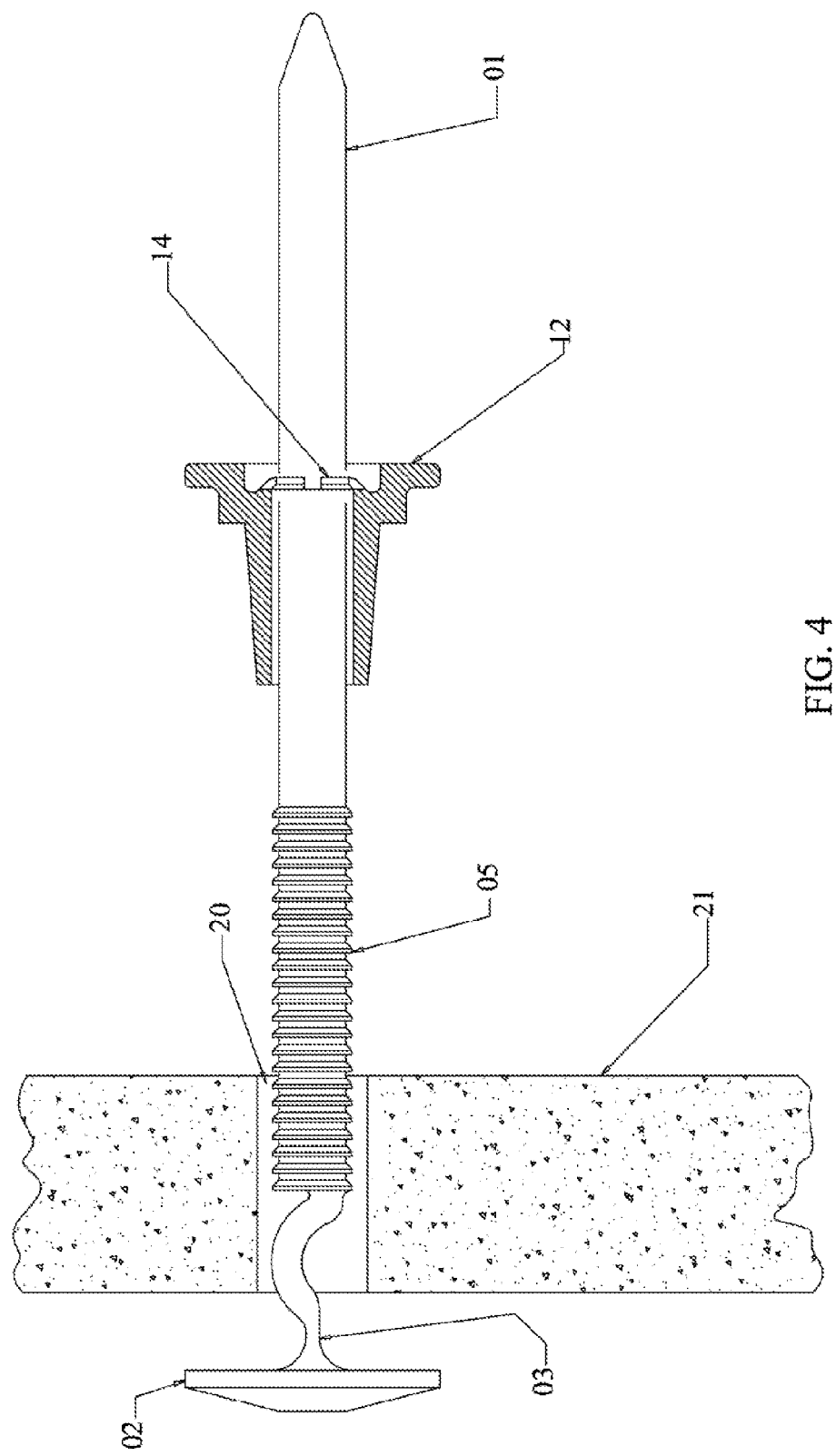
FIG. 4 illustrates the stem body of the anchor stem structure of the hollow wall anchor being inserted into the tube of the cleat in accordance with an embodiment of the presently claimed invention.

To install the rapid mounting hollow wall anchor, first drill a hole (20) in a plasterboard (21) of a hollow wall. The hole (20) should be having a diameter of approximately the same as the outer diameter of the tube (10) of the cleat. Bend the cross bar (02) for insertion into the drilled hole (20) as shown in FIG. 3. The cross bar (02) is to be inserted first. Once the cross bar (02) is fully inserted into the drill hole (20) and that the cross bar resumes its normal position in the cavity of the hollow wall and behind the back of the plasterboard (21), pull on to the stem away from the wall until cross bar (02) catches the rear surface of the plasterboard (21). Secondly, as shown in FIG. 4, insert the stem body (01) through the passage (11) of the tube (10) from the end distal from the flange (12), along the stem body (01) and push the tube (10) into the drilled hole (20) until the flange (12) is pressed firmly against the surface of the plasterboard (21). Again strongly pull the stem body (01) away from the plasterboard (21) while holding the cleat in place until the stem body (01) is stretched and that the latching cogs (05) on the anchor stem body (01) and the latching teeth (15) of the cleat are firmly engaged. In this position, the elastic expansion-tension element (04) is stretched and providing a pulling force on the stem body (01), in turn retaining the engaged cleat and its flange (12) firmly pressed against the plasterboard (21) surface.

Figure 5:
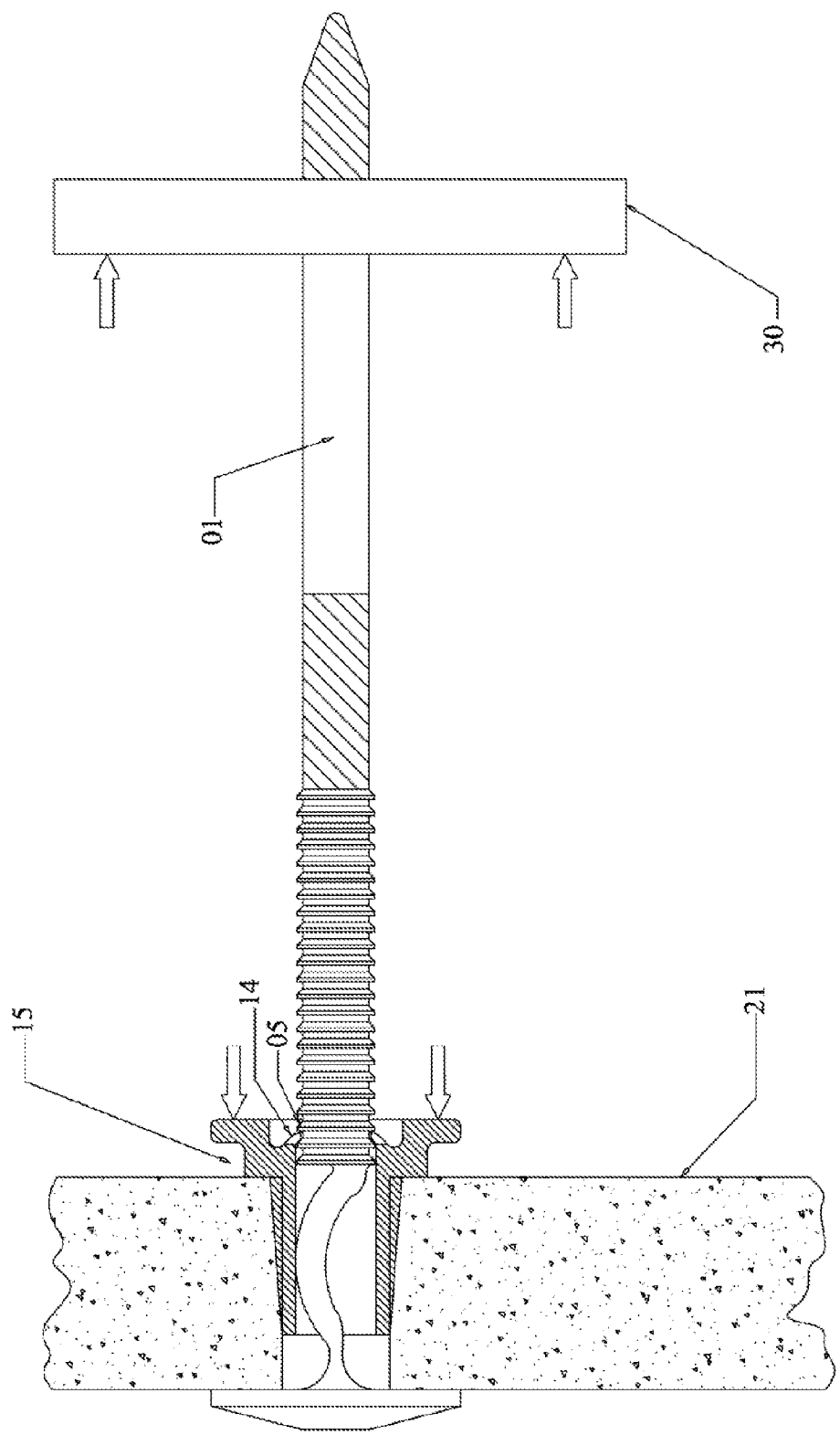
FIG. 5 illustrates the hollow wall anchor being secured in the drilled hole of the plasterboard of the hollow wall in accordance with an embodiment of the presently claimed invention.

Referring to FIG. 5. To aid the pulling of the stem body (01), a pulling bar (30) can be used as a gripping handle. To use, insert the pulling bar (30) through the pulling-slot (06) in the stem body (01) such that the stem body (01) is engaged with the pulling bar (30) at its midpoint. Any long and slim rigid object that can be inserted through the pulling-slot (06), such as a screwdriver, can be used in place of the pulling bar (30).

To complete the installation, cut the portion of the stem body (01) that is extending out from the cleat as shown in FIG. 5.

Referring FIGS. 6A and 6B. In an alternative embodiment, a hook (40) can be held and sandwiched between the flange (12) of the cleat and the surface of the plasterboard (21). The hook (40) has a hole with a diameter slightly larger than the outer diameter of the tube (10). During installation, the tube (10) is to be fitted within the hole of the hook (40) before inserting the stem body (01) through the anchor stem through passage (11).

The rapid mounting hollow wall anchor could be removed by unlocking the latching cogs (05) on the anchor stem body (01) from the latching teeth (15) of the cleat using a sharp pointed tool such as awl to push the latching teeth (15) sideway away from the latching cogs (05). Unlocking the latching cogs (05) from the latching teeth (15) releases the anchor structure from the cleat. The anchor structure could be pushed in to drop into the hollow space behind the plasterboard (21), and the cleat can be pulled out from the drilled hole (20).

In accordance to another embodiment, the tube (10) of the cleat has a plurality of ridges on its exterior surface. The ridges are spaced by unit length for measurement to aid the cutting of the tube (10) for matching the length of the tube (10) to the thickness of the plasterboard.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:
1. A hollow wall anchor comprising:
  a T-shaped anchor structure, comprising:
    a stem body,
    an elastic expansion-tension element being connected to a first end of the stem body,
    a hinge being connected to the elastic expansion-tension element, wherein the hinge being made of elastic material providing a resistive force when the cross bar is being bended, and
    a cross bar being perpendicularly connected to the stem body by the hinge, wherein the cross bar being bendable from a first position of being perpendicular to the stem body to a second position of being approximately parallel to the stem body; and a cleat for securing the T-shaped anchor structure in a drilled hole in a hollow wall, comprising
a tube having a through passage within, and
a flange being near or at a first end of the tube;
wherein under installed condition, the elastic expansion-tension element is stretched and providing a pulling force on the stem body, in turn retaining the engaged cleat and its flange firmly pressed against the hollow wall surface.

2. The hollow wall anchor of claim 1,
wherein the T-shaped anchor structure further comprises one or more latching cogs on at least a portion of the stem body; and
wherein the cleat further comprises one or more latching teeth inside the through passage of the tube for engaging the latching cogs on the stem body when the stem body is inserted in the through passage.

3. The hollow wall anchor of claim 1,
wherein the T-shaped anchor structure further comprises an opening in at least a portion of the stem body distal from the first end of the stem body.

4. The hollow wall anchor of claim 1,
wherein the flange of the cleat having a groove for hanging objects.

5. The hollow wall anchor of claim 1,
further comprising a hook being held between the flange of the cleat and the hollow wall under installed condition.

\* \* \* \* \*